(12) United States Patent
Kalisz et al.

(10) Patent No.: US 11,114,728 B2
(45) Date of Patent: Sep. 7, 2021

(54) HEAT APPLIED ELECTROCHEMICAL CELL SEPARATOR

(71) Applicant: Energizer Brands, LLC, St. Louis, MO (US)

(72) Inventors: David Kalisz, Westlake, OH (US); Johnson Mark, Westlake, OH (US); Allen Stieg, Westlake, OH (US); Maria Verikakis, Westlake, OH (US); Chris Bolyos, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 16/747,819

(22) Filed: Jan. 21, 2020

(65) Prior Publication Data

US 2020/0161619 A1    May 21, 2020

Related U.S. Application Data

(62) Division of application No. 15/805,718, filed on Nov. 7, 2017, now Pat. No. 10,581,052.

(51) Int. Cl.
*H01M 2/16* (2006.01)
*H01M 50/463* (2021.01)
(Continued)

(52) U.S. Cl.
CPC ......... *H01M 50/463* (2021.01); *H01M 6/005* (2013.01); *H01M 6/045* (2013.01);
(Continued)

(58) Field of Classification Search
CPC .. H01M 50/463; H01M 50/44; H01M 50/403; H01M 50/411; H01M 50/449;
(Continued)

(56) References Cited

U.S. PATENT DOCUMENTS

| 4,669,183 A | 6/1987 | Duncan et al. |
| H1088 H | 8/1992 | Marks |

(Continued)

FOREIGN PATENT DOCUMENTS

| EP | 1794826 B1 | 9/2012 |
| EP | 2135310 A1 | 4/2016 |

(Continued)

OTHER PUBLICATIONS

U.S. Appl. No. 15/805,718, filed Nov. 7, 2017, U.S. Pat. No. 10,581,052, Issued.

(Continued)

*Primary Examiner* — Michael L Dignan
(74) *Attorney, Agent, or Firm* — Alston & Bird LLP (57) ABSTRACT

A separator for a bobbin-style electrochemical cell is inserted into an interior opening within a ring-shaped cathode in an electrochemical cell can. An expansion force is then applied to an interior surface of the separator to press the separator against the interior walls of the cathode. A tool may then remove various creases and/or wrinkles in the separator and/or may then heat seal at least a portion of the tubular walls of the separator to minimize the void space between the separator and active material (e.g., cathode and/or anode) within the electrochemical cell.

10 Claims, 4 Drawing Sheets

(51) Int. Cl.
*H01M 6/04* (2006.01)
*H01M 6/00* (2006.01)
*H01M 50/44* (2021.01)
*H01M 50/403* (2021.01)
*H01M 50/411* (2021.01)
*H01M 50/449* (2021.01)
*H01M 50/429* (2021.01)
*H01M 4/04* (2006.01)
*H01M 4/10* (2006.01)
*H01M 6/08* (2006.01)

(52) U.S. Cl.
CPC ....... *H01M 50/403* (2021.01); *H01M 50/411* (2021.01); *H01M 50/4295* (2021.01); *H01M 50/44* (2021.01); *H01M 50/449* (2021.01); *H01M 4/0433* (2013.01); *H01M 4/0473* (2013.01); *H01M 4/10* (2013.01); *H01M 6/08* (2013.01); *H01M 2220/30* (2013.01); *H01M 2300/0014* (2013.01)

(58) Field of Classification Search
CPC .. H01M 50/4295; H01M 6/045; H01M 6/005; H01M 4/0433; H01M 4/10; H01M 4/0473; H01M 6/08; H01M 2300/0014; H01M 2220/30
See application file for complete search history.

(56) References Cited

U.S. PATENT DOCUMENTS

| | | | |
|---|---|---|---|
| 6,177,210 B1 * | 1/2001 | Lonsberry | H01M 6/005 429/133 |
| 6,270,833 B1 | 8/2001 | Yamashita et al. | |
| 6,596,121 B1 | 7/2003 | Reynolds, Jr. | |
| 6,656,630 B2 | 12/2003 | Reichert et al. | |
| 6,670,077 B1 | 12/2003 | Huang | |
| 6,830,845 B2 | 12/2004 | Shoji et al. | |
| 7,546,679 B2 | 6/2009 | Motherway et al. | |
| 7,763,384 B2 * | 7/2010 | Boone | H01M 10/24 429/229 |
| 7,799,455 B2 | 9/2010 | Smith et al. | |
| 8,835,040 B2 * | 9/2014 | Slivar | H01M 50/44 429/141 |
| 2002/0071915 A1 | 6/2002 | Schubert et al. | |
| 2003/0096171 A1 | 5/2003 | Thrasher et al. | |
| 2004/0058234 A1 | 3/2004 | Slezak | |
| 2004/0229116 A1 | 11/2004 | Malinski et al. | |
| 2009/0181294 A1 | 7/2009 | Yoppolo | |

FOREIGN PATENT DOCUMENTS

| | | |
|---|---|---|
| EP | 2345098 A1 | 6/2016 |
| WO | WO-1997/017736 | 5/1997 |
| WO | WO-2004/064175 A2 | 7/2004 |

OTHER PUBLICATIONS

International Searching Authority, International Search, Report and Written Opinion for International Application No. PCT/US2018/055463, dated Dec. 13, 2018, 15 pages, European Patent Office, Netherlands.

International Searching Authority, International Search Report and Written Opinion for International Application No. PCT/US2019/036781, dated Sep. 12, 2019, (14 pages), European Patent Office, Rijswijk, The Netherlands.

* cited by examiner

HEAT APPLIED ELECTROCHEMICAL CELL SEPARATOR

CROSS-REFERENCE TO RELATED APPLICATIONS

This patent application is a divisional of U.S. patent application Ser. No. 15/805,718, filed Nov. 7, 2017, which is incorporated herein by reference in its entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras.

Battery manufacturers have made great strides to improve the capacity of the cells to improve the length of time that electrical devices can be powered, while at the same time complying with the applicable dimensional standards for each cell size. As the shape and size of the batteries are often fixed, battery manufacturers must modify cell characteristics to provide increased performance. For example, battery manufacturers generally seek to maximize the total amount of active material, including both the positive electrode (cathode) material and negative electrode (anode) material.

Due to consumers' increasing need for high-capacity electrochemical cells offering maximal run-time, there is a constant need for improved electrochemical cell constructions offering improved discharge performance.

BRIEF SUMMARY

To provide increased electrochemical cell discharge performance, various embodiments are directed to electrochemical cell constructions comprising a hollow container housing a tubular cathode ring surrounding an interior of the hollow container. An electrochemical cell separator is positioned within the hollow interior of the cathode, and is compressed against the interior wall of the cathode to minimize the number of creases within the separator itself and/or to minimize the number of voids between the separator and the cathode. The separator may be steamed in situ to further decrease the number of creases within the separator itself and/or may be heat-sealed to prevent the positive and negative active materials from coming in direct contact.

Certain embodiments are directed to a method for forming a separator within an electrochemical cell. The method may comprise: providing a cylindrical electrochemical cell can having an active material ring disposed proximate an interior surface of the cell can; pressing a separator into an opening within the active material ring; and applying radial pressure to press the separator against interior walls of the active material ring.

In various embodiments, the separator comprises separator comprises at least two adjacent plies, and wherein the method further comprises heating at least a portion of the separator to bond at least a portion of the adjacent plies together. Moreover, the separator may comprise sidewalls pressed against the interior walls of the active material ring, and a closed bottom end, and wherein the method may further comprise heating at least a portion of the sidewalls of the separator to heat seal adjacent plies of the sidewalls together.

The method may additionally comprise steps for forming a convolute separator by winding a separator sheet around a die; and wherein pressing the separator into the opening comprises pressing the convolute separator into the opening. In certain embodiments, the convolute separator has a tubular sidewall and a closed bottom end, and the tubular sidewall comprises at least one overlapping portion comprising at least two adjacent layers of the separator sheet; and the method further comprising steps for heating at least a part of the overlapping portion to heat seal the adjacent layers of the separator sheet. Moreover, the method may further comprise steps for heating at least a portion of the closed bottom end to heat seal the closed bottom end. The separator sheet of certain embodiments may be a nonwoven fibrous separator sheet comprising thermoplastic fibers, and heating the at least a part of the overlapping portion may melt at least a portion of the thermoplastic fibers. In certain embodiments, heating at least a part of the overlapping portion comprises applying an at least substantially uniform heat to the interior surface of the separator.

In certain embodiments, the method further comprises steaming the separator after pressing the separator into the opening. In various embodiments, pressing the separator into the opening comprises pressing the separator into the opening with a separator insertion tool; and expanding the separator comprises inflating an expandable bladder defining an exterior surface of the separator insertion tool to apply radial pressure the separator. In certain embodiments, inflating the expandable bladder comprises providing a heated fluid to an interior portion of the expandable bladder to apply heat to the separator.

Certain embodiments are directed to an electrochemical cell comprising: a container; a ring-shaped cathode disposed within the container wherein the cathode defines an exterior surface in contact with the container and an interior surface surrounding a hollow interior; an anode disposed within the hollow interior of the cathode; and a separator positioned between the cathode and the anode, wherein the separator has a tubular sidewall and a closed bottom end, wherein the tubular sidewall has at least one overlapping portion defined by at least two layers of a separator sheet being positioned between the cathode and the anode, and wherein at least part of the overlapping portions is heat sealed such that the at least two layers are bonded relative to one another.

In various embodiments, the separator is a nonwoven fibrous separator. Moreover, the nonwoven fibrous separator may comprise thermoplastic fibers and wherein portions of the thermoplastic fibers positioned within at least part of the overlapping portions may be melt-bonded relative to one another. Moreover, the separator sheet may be ion permeable and/or the overlapping portions of the separator sheet may be ion permeable.

In certain embodiments, the separator is a convolute separator comprising a spirally wound separator sheet having a first end and a second end, and wherein the first end overlaps the second end to form the heat-sealed overlapping portion. Moreover, at least a portion of the closed bottom end may be heat sealed. In certain embodiments, the separator has an open top end opposite the closed bottom end, and wherein the heat sealed portion extends between the open top end and the closed bottom end.

Certain embodiments are directed to a separator insertion tool for inserting a separator into a cylindrical electrochemical cell, the separator insertion tool comprising: a body portion for pressing the separator into the cylindrical electrochemical cell; and an expansion member for selectably expanding the body portion to apply expansive forces onto an interior surface of the separator.

In various embodiments, the body portion comprises a rigid cylindrical rod. Moreover, the expansion member comprises an inflatable bladder surrounding the rigid cylindrical rod. In certain embodiments, the separator insertion tool further comprises a fluid conduit extending at least partially through the body portion, and the separator insertion tool may be configured to selectably expand the inflatable bladder by directing fluid through the fluid conduit and into the interior of the inflatable bladder. Moreover, the separator insertion tool may further comprise a heating element configured to heat seal at least a portion of the separator and/or at least one steam vent configured to emit steam into the separator.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Electrochemical Cell

Figure 1:
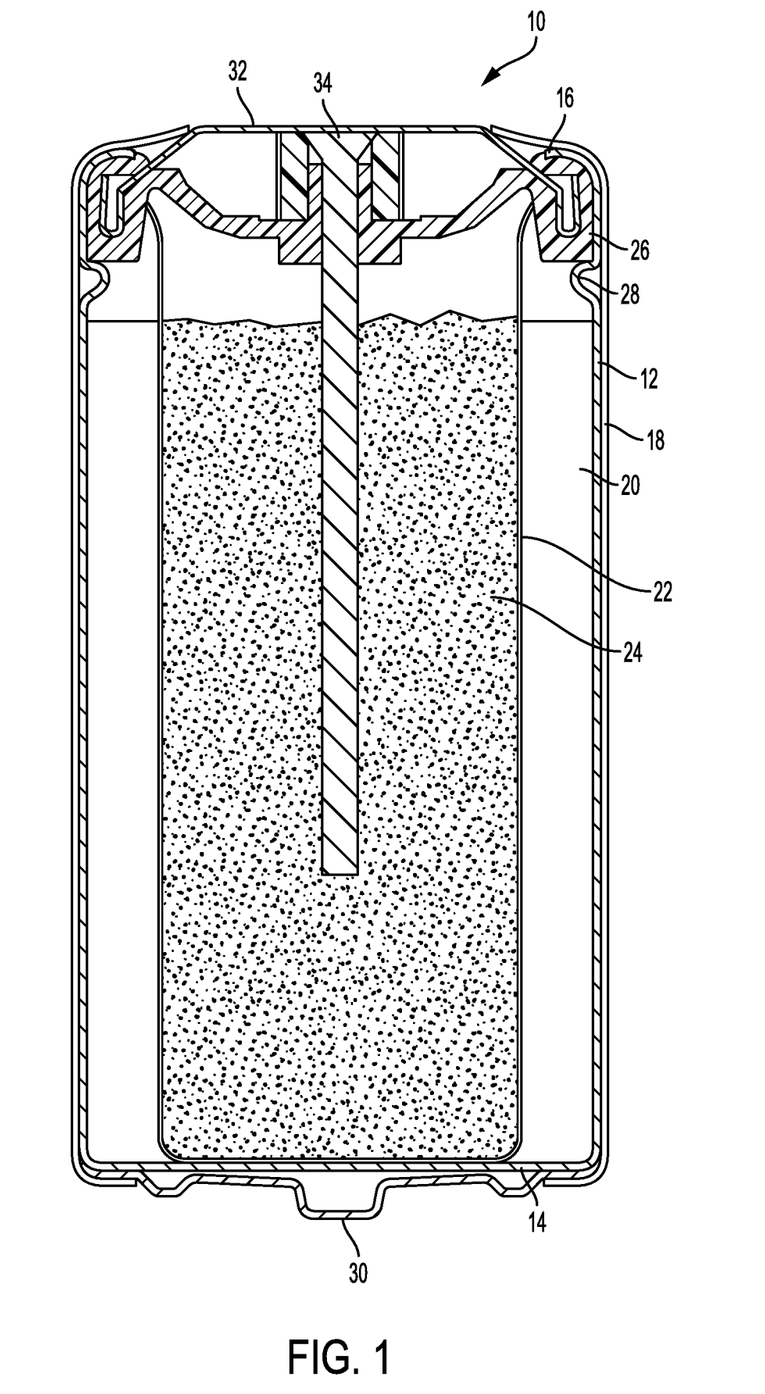
FIG. 1 is a cross-sectional view of a bobbin-style electrochemical cell according to one embodiment.

Referring now to FIG. 1, a bobbin-style electrochemical cell 10 is shown according to one embodiment of the present invention. In the illustrated embodiment of FIG. 1, the electrochemical cell is an alkaline cell having a manganese dioxide cathode active material and a zinc anode active material. However, it should be understood that the electrochemical cell may have any of a number of active material chemistries.

The alkaline electrochemical cell 10 shown in the exemplary embodiment and described herein is a cylindrical primary (non-rechargeable) battery cell of size LR6 (AA). However, it should be appreciated that the teachings of the present invention may be applicable to other alkaline electrochemical cells of other shapes and sizes, including LR03 (AAA), LR14 (C) and LR20 (D) size cylindrical battery cells, as examples. Moreover, although the following specifically discusses cylindrical electrochemical cells, it should be understood that various embodiments are applicable for other cell shapes, such as rectangular electrochemical cells, and/or the like. Additionally, the electrochemical cell 10 may be employed as a single cell battery or may be employed in a multiple cell battery.

The electrochemical cell 10 comprises a cylindrical container 12 that may be embodied as a metallic (e.g., steel) can, having a closed end 14, an open opposite end 16, and a cylindrical side wall extending between the opposite ends. The cylindrical container 12 is made of a suitable electrically conductive metal that may be formed into a desired shape and is adapted to seal the internal contents within the cell 10. In the embodiment shown, the cylindrical container 12 also functions as the cathode current collector, and therefore exhibits good electrical conductivity. In one embodiment, the cylindrical container 12 may be plated with nickel and cobalt, such as may be achieved in an annealing process. The interior surface of the cylindrical container 12 may be coated with a graphite, if desired. In one example of an LR6 size cell, the cylindrical container 12 has a wall thickness of about 0.010 inch (10 mils or 0.025 cm) and the cylindrical wall has an outside diameter of about 0.548 inch (1.392 cm).

A positive contact terminal 30 comprising a plated steel or other conductive metal material is welded or otherwise secured onto the closed end 14 of the cylindrical container 12 in the illustrated embodiment of FIG. 1. However, in certain embodiments, the positive contact terminal 30 may be integrally formed as a portion of the cylindrical container 12. The positive contact terminal 30 has a protruding nubbin (i.e., protrusion), at its center which serves as the positive contact terminal of the cell 10. Assembled onto the opposite open end 16 of the cylindrical container 12 is a collector and seal assembly made up of an anode current collector 34 (e.g., nail), a polymeric (e.g., nylon) seal 26 and a negative contact terminal 32. The open end 16 of container 12 is crimped onto the seal 26 which abuts bead 28 to seal closed the open end 16 of container 12. The negative contact terminal 32 forms a negative contact terminal of the cell 10. Positive and negative contact terminals 30 and 32 are made of electrically conductive metal and serve as the respective positive and negative electrical terminals. Additionally, a jacket 18 may be formed about the exterior surface of the cylindrical container 12, and may include an adhesive layer, such as a metalized, plastic film layer.

Disposed within the sealed volume of cylindrical container 12 is a positive electrode, referred to as the cathode ring 20, generally positioned adjacent the interior surface of the cylindrical container 12. The cathode has an exterior shape corresponding to the shape of the container (e.g., the cathode positioned within cylindrical container 12 has a generally cylindrical shape) with an interior surface defining an interior cavity therein. For example, the interior cavity may have a generally cylindrical shape, having an inside diameter ID. However, it should be understood that the interior cavity may have any of a variety of shapes. As other examples, the interior cavity may have a star-shape, an elliptical shape, a "gear" shape (having a plurality of interconnected cavities extending around a central hub, thus providing the general shape of a gear), and/or the like. A separator 22 is disposed in the interior cavity and contacts the interior surface of the cathode ring 20. A negative electrode, referred to as the anode 24, is disposed within the interior cavity inside the separator 22. Additionally, an alkaline electrolyte solution, including water, is disposed within the sealed volume of the container 12 in contact with both the anode 24 and the cathode ring 20.

As discussed herein, the illustrated cathode ring 20 of FIG. 1 includes manganese dioxide ($MnO_2$) as the electrochemically active material of the positive electrode. Cathode ring 20 is generally formed of a mixture of manganese dioxide, graphite, barium sulfate, and aqueous alkaline electrolyte solution. According to an impact molding embodiment, the cathode 20 may be formed by disposing a quantity of the cathode mixture into the open ended container 12 and, with use of an impact molding ram, molding the mixture into a solid tubular (e.g., cylindrical) configuration that defines a cavity generally concentric with the side wall of the container 12. Alternately, according to a ring molding embodiment, the cathode ring 20 may be formed by preforming a plurality of rings (e.g., three or four rings) from the cathode mixture and then inserting the preformed rings into the container 12 to form the tubular shaped cathode ring 20. In certain embodiments, the interior surface of the cathode ring 20 (whether formed via impact molding or ring molding) may have a generally circular cross-section, a generally elliptical cross-section, a generally "star"-shaped cross-section, and/or the like.

The anode 24, also referred to herein as the negative electrode, may include a homogeneous mixture of an aqueous alkaline electrolyte, a zinc powder and a gelling agent, such as cross-linked polyacrylic acid. The zinc powder is the electrochemically active material of the anode 24. The aqueous alkaline electrolyte may include an alkaline metal hydroxide, such as potassium hydroxide (KOH), sodium hydroxide or mixtures thereof. A gelling agent suitable for use in the anode 24 may include a cross-linked polyacrylic acid, such as Carbopol 940®, which is commercially available from Noveon, Inc., of Cleveland, Ohio. Examples of other gelling agents that may be suitable for use in the cell 10 may include Carboxymethylcellulose, polyacrylamide and sodium polyacrylate. The zinc powder may include pure zinc or zinc alloy. Additional optional components of the anode 24 may include gassing inhibitors, organic or inorganic anti-corrosive agents, binders or surfactants that may be added to the ingredients listed above. Examples of suitable gassing inhibitors or anti-corrosive agents include indium salts (such as indium hydroxide), perfluoroalkyl ammonium salts, alkali metal sulfides, etc. Examples of suitable surfactants include polyethylene oxide, polyethylene, alkylethers, perfluoroalkyl compounds and the like. The anode 24 may be manufactured by combining the ingredients into a ribbon blender or drum mixer and then working the anode mixture into a wet slurry.

In addition to the aqueous alkaline electrolyte absorbed by the gelling agent during the anode manufacturing process, an additional quantity of aqueous solution containing a solution of potassium hydroxide and water, also referred to herein as free electrolyte, is added to the electrochemical cell 10 during the manufacturing process. The free electrolyte may be incorporated into the cell 10 by disposing it into the cavity defined by the cathode ring 20 after the separator 22 is inserted and may also be injected after the anode 24 is disposed into the cell. According to one embodiment, the aqueous solution contains approximately thirty-seven percent (37%) by weight KOH, and sixty-three percent (63%) deionized water.

In the bobbin-type zinc/manganese dioxide alkaline cell 10 shown and described herein, the separator 22 may be provided as a layered ion permeable, non-woven fibrous fabric which separates the cathode ring 20 from the anode 24. The separator 22 maintains a physical dielectric separation of the cathode electrochemically active material (manganese dioxide) and the anode electrochemically active material (zinc) and allows for the transport of ions between the positive and negative electrode materials. Additionally, the separator 22 acts as a wicking medium for the aqueous electrolyte solution and as a collar that prevents fragmented portions of the anode 24 from contacting the top of the cathode ring 20. The separator 22 may include a conventional non-woven separator typically made of two or more layers of paper in the shape of a basket having a cylindrical wall and a closed bottom end.

The separator 22 comprises an ion permeable material having a high electrical resistance (i.e., low electrical conductivity), such as a thin nonwoven fabric. The separator may be a single-ply or multi-ply (e.g., two-ply) construction to provide a desired porosity to achieve the desired electrical resistance and ion-permeability while maintaining a low overall volume within an electrochemical cell. As mentioned above, because the overall volume of electrochemical cells are generally fixed, minimizing the overall volume of non-active materials (such as the separator) within an electrochemical cell provides additional volume within the cell that may be occupied by electrochemical materials such as the cathode and/or anode.

The nonwoven fabric of the separator 22 may be embodied as a fiber paper comprising natural, artificial, and/or synthetic fibers. For example, the fiber paper may comprise a blend of synthetic and artificial fibers, a blend of synthetic fibers and natural materials (e.g., wood pulp), and/or the like. As a specific example, the fiber paper may comprise fibrillated cellulose fibers and synthetic fibers. In certain embodiments, the synthetic fibers may comprise a thermoplastic material, such as polyvinyl alcohol fibers having a melting point of at least about 60° C., phenylboronic acid fibers (PBA fibers), and/or the like. In certain embodiments, the synthetic fibers may comprise first synthetic fibers that are soluble in water at a temperature of at least 60° C. and second synthetic fibers that are insoluble in water. Moreover, the fiber paper may comprise solvent spun cellulose fibers subject to fibrillation in well-known refinement and digestion processes in paper manufacturing.

The combination of the cellulose fibers and the synthetic fibers provide a porous, non-woven fabric that may be rolled/coiled to form a tubular and/or convolute shape before or after being inserted into an electrochemical cell 10. Moreover, the bottom end of the tubular separator 22 may be folded to form a closed bottom end having a "cup" shape that may be inserted into an electrochemical cell. As yet another example, the separator 22 may comprise a cross-strip separator construction comprising two separator paper/fabric strips the centers of which are overlapped and the strips are disposed at right angles such that the overlapped strips collectively have 4 at least substantially equal-sized portions extending at right angles relative to one another from a central hub portion. When inserted, each of the 4 portions is folded upward toward the central portion to form an at least substantially cylindrical shape with the hub portion defining the base of the formed cylinder. Such an embodiment may form 4 overlapping portions as discussed in greater detail herein.

Once inserted into the electrochemical cell, the resulting separator 22 defines an exterior surface surrounding the outside of the resulting separator. The exterior of the sidewalls are in contact with an interior surface of the cathode, and the exterior bottom surface of the separator is in contact with a portion of the can. As shown in the exploded view of FIG. 2, the inserted convolute separator 22 defines one or more overlapping portions 23 in which at least two layers of separator paper are aligned to overlap one another within the electrochemical cell 10. In embodiments in which the separator 22 is defined as an at least substantially continuous flat sheet of paper that is rolled to form the convolute separator, the overlapping portions are located adjacent opposite ends of the continuous sheet of separator paper, and have a length (measured along the coiled length of the separator paper) equal to the portion of overlapping paper. Thus, the overall size of the overlapping portions 23 are equal to the area of the thickest portion (measured in terms of greatest number of separator sheet layers) of the separator 22. Moreover, the flat bottom end of the separator 22 comprises overlapping portions to define a closed bottom end of the separator 22.

Figure 2:
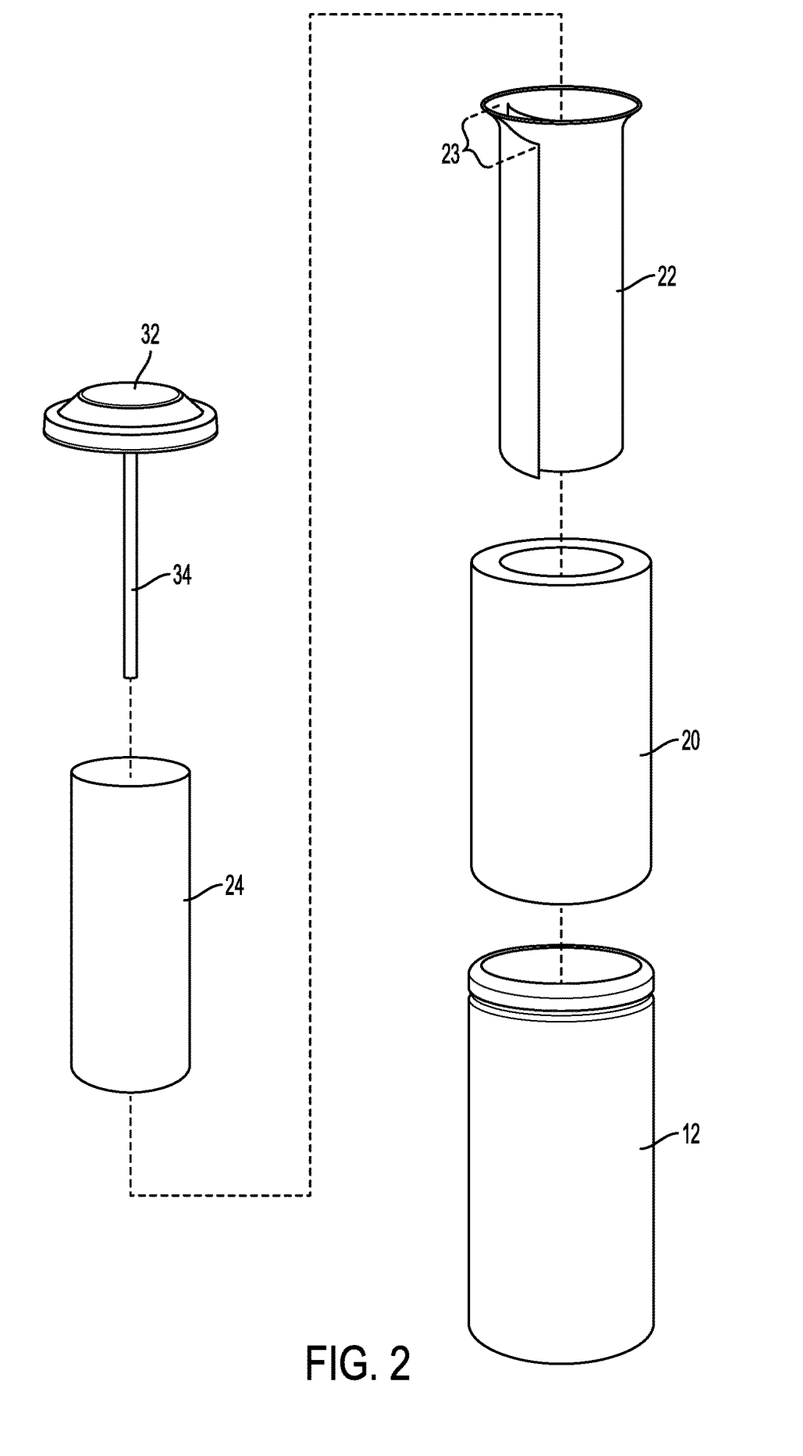
FIG. 2 is an exploded view of a bobbin-style electrochemical cell according to one embodiment.

In certain embodiments, one or more overlapping portions of the separator 22 sidewalls and/or bottom end are heat sealed to at least partially secure overlapping portions of the separator relative to one another. As discussed in greater detail herein, the overlapping portions of the separator 22 are heat sealed by applying a heat source (e.g., a steam filled chamber, a resistance heater, and/or the like) to at least the overlapping portions of the separator 22. The applied heat causes at least a portion of the synthetic fibers within the separator paper to melt and bond with portions of an overlapping portion of separator 22, thereby mechanically bonding the overlapping portions of the separator 22. For example, a portion (e.g., a linear portion) of the separator 22 sidewalls extending between an open upper end of the separator 22 and a closed bottom end of the separator 22 may be heat sealed.

The resulting heat sealed separator 22 defines an at least substantially continuous separator having a shape corresponding to the interior surface of the cathode ring 20 (e.g., a cylindrical separator shape corresponding to a cylindrical cathode ring 20) without gaps between overlapping portions of the separator 22. The heat sealed separator 22 thus prevents undesirable movement of anode or cathode material between sheets of the separator material that may cause internal short circuits within the electrochemical cell.

Moreover, in certain embodiments the separator 22 may be applied directly onto the interior surface of the cathode ring 20 once inserted into the electrochemical cell 10. The separator 22 may thus be applied to minimize the number and/or size of gaps between the interior surface of the cathode ring 20 and the exterior surface of the separator 22. Because each of those gaps occupy interior volume within the electrochemical cell 10 that may otherwise be filled with active material, minimizing the number and/or volume of gaps between the cathode ring 20 and the separator 22 may provide an increased usable portion of the interior volume that may be utilized for active material within the electrochemical cell 10.

In certain embodiments, radial pressure is applied to the separator 22 utilizing an expandable insertion tool 100 as discussed in greater detail herein. The expandable insertion tool 100 may be configured to press (e.g., radially press) the separator 22 against the interior surface of the cathode ring 20. Moreover, the expandable insertion tool 100 may be configured to apply steam to the separator 22 once inserted into the electrochemical cell 10 to remove and/or minimize one or more creases within the separator material.

In various embodiments, the insertion tool 100 may be configured to expand and/or steam the separator paper prior to applying heat to heat seal portions of the sidewalls of the separator 22 to minimize gaps and/or creases between the separator 22 and the cathode ring 20 before heat sealing the separator 22. However, in certain embodiments the insertion tool 100 may be configured to concurrently expand and press the separator 22 against the interior surface of the cathode ring 20 and to apply heat (e.g., dry heat or moist heat) to heat seal the overlapping portions of the separator 22. In certain embodiments, the insertion tool 100 may be configured to emit steam at a temperature sufficient to simultaneously remove creases within the separator 22 and to heat seal overlapping portions 23 of the separator 22 relative to one another.

Separator Insertion Tool

Various embodiments are directed to an insertion tool 100 configured for inserting a separator 22 (e.g., a convolute separator, a cross-strip separator, and/or the like) into an electrochemical cell 10 and for smoothing the separator 22 along the interior wall of a cathode ring 20 within an electrochemical cell 10. The insertion tool 100 may be embodied as an at least substantially cylindrical component that may be used to engage and insert an at least substantially cylindrical separator 22 into an at least substantially cylindrical electrochemical cell 10. In certain embodiments, the insertion tool 100 is configured for inserting a separator 22 into an irregular or otherwise non-cylindrical cavity within a cathode ring 20. Accordingly, the insertion tool 100 may have any of a variety of cross-sectional shapes, such as a shape corresponding to a shape of the cathode ring 20 interior cavity.

Figure 3A:
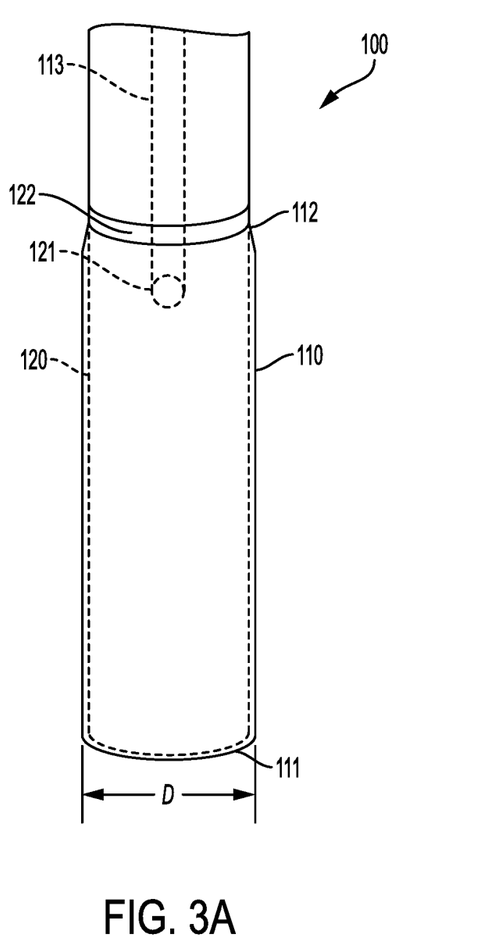
FIGS. 3A-3B illustrate embodiments of a separator insertion tool in accordance with the present description.
Figure 3B:
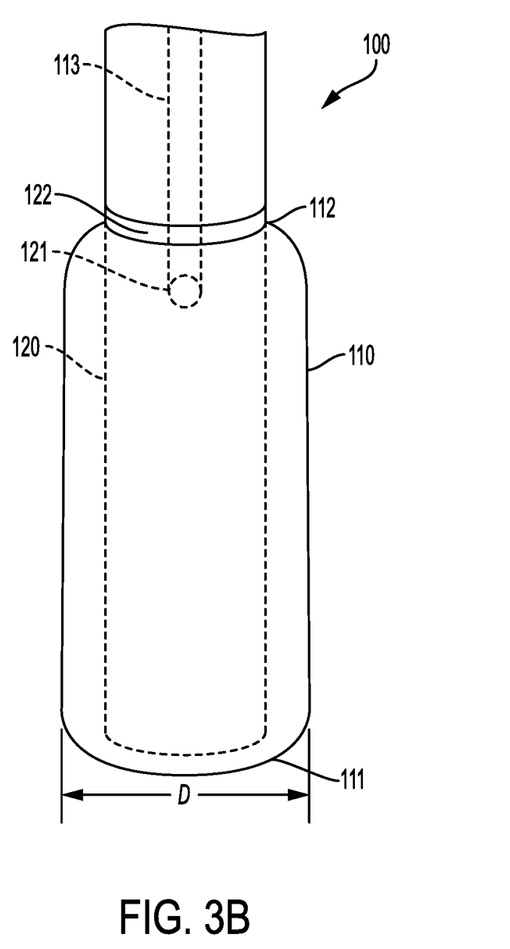

FIGS. 3A-3B schematically illustrate one embodiment of a separator insertion tool 100. As shown in FIGS. 3A-3B, the separator insertion tool 100 may comprise an expansion component configured to expand a diameter D of the separator insertion tool 100 to provide radial forces onto the interior surface of the separator 22. The expansion component may comprise an inflatable bladder 110 that may be selectively filled with a fluid (e.g., air, heated air, steam, inert gas, heated inert gas, water, heated water, oil, heated oil, and/or the like) to expand the diameter D of the inflatable bladder 110.

The inflatable bladder 110 may surround a rigid insertion rod 120 configured to press the separator 22 into the interior of the electrochemical cell 10. The rigid insertion rod 120 may comprise a metal material (e.g., aluminum, steel, stainless steel, titanium, and/or the like), a plastic material (e.g., a high-heat resistant plastic, a thermoplastic, a thermoset plastic, and/or the like), a composite material, a ceramic material, and/or the like. In certain embodiments, rigid insertion rod 120 may comprise one or more fluid vents 121, valves, and/or the like configured to selectively enable fluid to be added to the interior of the inflatable bladder 110. For example, the one or more fluid vents 121 may extend into an interior of the rigid insertion rod 120 into fluid communication with a fluid conduit 113 extending through an interior portion of the rigid insertion rod 120 to a fluid source (e.g., a pump, a compressed fluid storage container, and/or the like). As yet another example, the rigid insertion rod 120 may be embodied as a porous rigid rod (e.g., comprising a plurality of sintered particles collectively forming a rigid, porous rod that fluid may flow through) defining a fluid conduit 113 through a central portion of the rigid rod 120.

In certain embodiments, the inflatable bladder 110 may comprise an elastic material having an at least substantially smooth surface. For example, the inflatable bladder 110 may comprise an elastic plastic material configured to expand and stretch upon introduction of a fluid (e.g., a high-pressure fluid) within the interior of the inflatable bladder 110. In certain embodiments, the inflatable bladder 110 comprises an elastic sack enclosing the one or more fluid vents 121, valves, and/or the like of the rigid insertion rod 120, and the elastic sack may have a closed end 111 and an open end 112. The open end 112 is secured with an airtight seal relative to a portion of the insertion tool at a seal member 122. The closed end 111 may extend around a rigid bottom portion of the rigid insertion rod 120. When in the unexpanded configuration, the inflatable bladder 110 may be form-fit around the rigid insertion rod 120 of the separator insertion tool 100, such that the rigid insertion rod 120 of the separator insertion tool 100 may be utilized to form the cylindrical separator 22 (e.g., by wrapping planar separator paper around the rigid insertion rod 120) and to initially guide the separator 22 into the electrochemical cell 10. Once the separator 22 is placed within the electrochemical cell 10, the inflatable bladder 110 may be inflated such that the bladder expands away from the rigid insertion rod 120 in the separator 22 to apply radial pressure onto the separator 22 to press the separator against the interior walls of the cathode ring 22. The inflatable bladder 110 may expand and contour to the interior surface of the cathode ring 20, thereby forming the separator 22 against the cathode ring 20. Thus, if the cathode ring 20 has an irregular interior surface, the inflatable bladder 110 may press the separator 22 against the irregular interior surface to conform the separator 22 to the shape of the cathode ring 20. As a specific example, the separator 22 and the inflatable bladder 110 may expand within an interior opening of the cathode ring 20 having a gear-shaped cross-section (as described herein) such that the separator 22 is pressed into the plurality of interconnected cavities such that the separator 22 takes on a gear shaped cross-section conforming to the shape of the interior surface of the cathode ring 20. For example, a pump mechanism in fluid communication with the interior of the inflatable bladder 110 via the fluid conduit 113 and one or more fluid vents 120 may be configured to pump fluid into the interior of the inflatable bladder 110 until the bladder reaches a defined pressure to press a separator 22 formed around the rigid insertion rod 110 against the interior walls of a cathode ring 20. Moreover, the pump may be reversible in certain embodiments, to deflate the inflatable bladder 110 such that the separator insertion tool 100 may be easily removed from the interior of the electrochemical cell after the separator 22 is positioned against the interior walls of the cathode ring 20. In certain embodiments, the inflatable bladder 110 may comprise one or more vents, holes, valves, and/or the like to allow fluid (e.g., air, steam, and/or the like) to exit through the inflatable bladder 110 into the electrochemical cell 10.

In certain embodiments, the inflatable bladder 110 may expand laterally, with the bottom portion (e.g., closed end 111) of the inflatable bladder 110 secured relative to the rigid insertion rod 120 of the insertion tool 100 to press the sidewall of the separator 22 against the interior sidewall of the cathode ring 20. However in certain embodiments the closed bottom portion 111 of the inflatable bladder 110 may be configured to expand away from the rigid insertion rod 120 of the insertion tool 100 to depress the closed bottom end of the convolute separator 22 against the closed bottom end of the electrochemical cell 10.

In various embodiments, the inflatable bladder 110 may comprise an elastic plastic material having a high melting point, such that high temperature fluids may be utilized to inflate the inflatable bladder 110. In such embodiments, the elastic material of the inflatable bladder 110 may also be a heat conductive material (or an inefficient heat insulator) such that heat from the heated fluid may be transferred (e.g., via conductive and/or convective heat transfer) from the inflatable bladder 110 to the separator 22. As discussed herein, the insertion tool 100 may be configured to apply sufficient heat to the separator material to heat-seal overlapping portions of the separator 22. Accordingly, the fluid within the inflatable bladder 110 may be sufficiently hot that the inflatable bladder 110 may heat seal the separator 22 upon compressing the inflatable bladder 110 against the interior surface of the separator 22. In embodiments in which the fluid utilized to expand the inflatable bladder 110 is utilized to heat seal the separator 22, the separator insertion tool 100 may be configured to apply an at least substantially uniform heat across at least substantially the entirety of the interior surface of the separator 22 sidewall.

Figure 4:
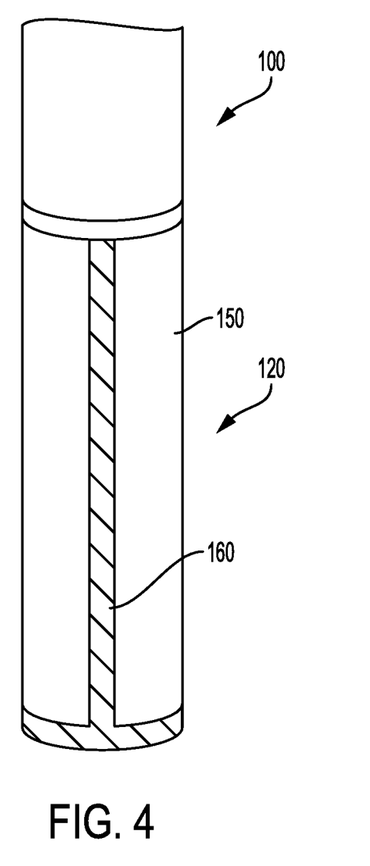
FIGS. 4-5 illustrate additional example embodiments of a separator insertion tool in accordance with the present description.
Figure 5:
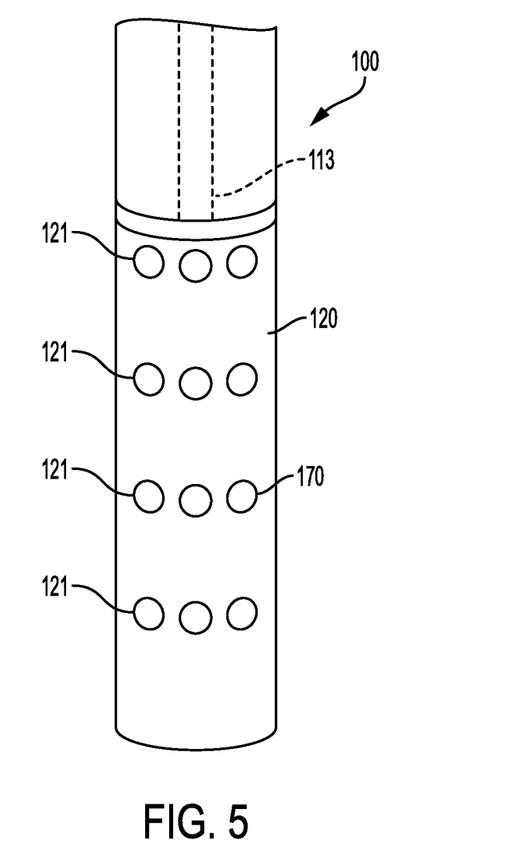

In certain embodiments, the expansion mechanism may be embodied as one or more panels 150 that may expand outward from a rigid portion 120 of the insertion tool 100. Each of the panels 150 may be at least partially rigid, and each may be configured to expand outward via a mechanical mechanism (e.g., a hydraulic or pneumatic mechanism, a mechanical linkage, and/or the like) to apply an outward, radial pressure onto the separator 22 to press the separator 22 against the interior surface of the cathode ring 20. In certain embodiments, the insertion tool 100 may comprise a plurality of expandable panels 150 (e.g., 2 panels, 3 panels, 4 panels, 6 panels, 8 panels, and/or the like) to provide a generally uniform pressure onto the separator 22.

Moreover, the insertion tool may comprise one or more heat seal mechanisms 160, such as a resistance heater wire, that may be configured to apply (e.g., conduct) heat directly to the separator 22 to heat seal the separator 22. The heat seal mechanism 160 may be provided on insertion tools 100 with or without one or more expansion mechanisms, such that the heat seal mechanism 160 is configured to heat seal the separator 22 once the separator 22 is in its final position within the electrochemical cell 10. The heat seal mechanism 160 may be configured for near-instantaneous heat sealing, gradual heat sealing, and/or the like. The heat seal mechanism 160 may be further configured to seal at least a portion of the tubular sidewall of the separator and/or at least a portion of the closed bottom end of the separator 22.

The heat seal mechanism 160 may extend along at least a portion of the length of the separator insertion tool 100 to heat seal at least a portion of the separator 22 sidewall. For example, the heat seal mechanism 160 may extend at least substantially linearly along at least a portion of the length of the separator insertion tool 100 to form a heat seal along at least substantially the entire height of the separator 22, extending between an open upper end of the separator 22 to the closed bottom end of the separator 22.

The insertion tool 100 may additionally comprise one or more steam nozzles 170 configured to apply steam to the separator 22 to at least partially heat and/or moisten the separator 22 to promote bonding between overlapping portions of the separator 22 when positioned within the electrochemical cell 10. In certain embodiments, the steam nozzles 170 may be configured to apply steam to the separator 22 prior to applying heat and pressure to press the separator 22 against the cathode ring 20. The combination of heat and moisture applied to the separator 22 may cause the one or more synthetic materials within the separator 22 to dissolve and, upon drying, plasticize to heat seal adjacent portions of the separator 22.

Method of Manufacture

Manufacturing of an electrochemical cell 10 according to various embodiments begins by providing a cylindrical container 12 having an open top end and a closed bottom end. In certain embodiments, the closed bottom end may define a protrusion (e.g., in the form of a plate welded onto the closed bottom end or a protrusion integrally formed with the cylindrical container 12 itself. Active materials are then added to the interior of the cylindrical container 12 through the open top end. Cathode material is first added to the cylindrical container 12 to form a cathode ring 20 adjacent the outer wall of the cylindrical container 12. As noted above, the cathode material may be premolded into cathode rings, and one or more cathode rings may be added into the interior of the cylindrical container 12. Alternatively, granular cathode material may be added to the interior of the cylindrical container 12, and a molding ram may be inserted into the interior of the cylindrical container 12 to impact mold the cathode material into a continuous cathode ring 20.

Once the cathode ring is positioned within the interior of the cylindrical container 12, the cathode ring 20 has an exterior surface adjacent the interior surface of the cylindrical container 12 wall and an interior surface defining an opening (e.g., a cylindrical opening) at least substantially within the center of the cylindrical container 12. The separator 22 may then be placed within the opening within the interior of the cathode ring 22. In certain embodiments, the separator 22 may be formed of an at least substantially continuous rectangular paper sheet that is coiled around an at least substantially cylindrical insertion tool 100 to form a convolute separator 22. The coiled paper sheet may form a single-layer ring having a short overlapping portion where portions proximate opposing ends of the paper sheet overlap to form an overlapping portion 23 comprising a two-layer portion. In certain embodiments, the coiled paper sheet may form a multi-layer ring (e.g., at least two layers) having an overlapping portion where portions proximate opposing ends of the paper sheet overlap to form an overlapping portion 23 comprising at least one additional layer (e.g., at least three layers where the convolute separator 22 comprises at least two layers). A bottom end of the resulting convolute separator 22 is folded inward over an end of the insertion tool to form a closed bottom end of the convolute separator 22.

It should be understood that the separator 22 may be formed by folding and/or rolling paper in a variety of ways to provide a separator 22 having a closed bottom end. In certain embodiments, the separator 22 may comprise a plurality of overlapping portions. For example, a separator may be a cross-strip separator comprising one or more separator paper sheets folded over an end of an insertion tool 100 (e.g., in a "U" shape), and the portions of the separator paper sheet located on opposite sides of the insertion tool 100 may be folded toward one another, around the cylindrical insertion tool 100 to form a cylindrical separator 22. In such an embodiment, the cylindrical separator 22 has two overlapping portions 23 on opposite sides of the resulting cylindrical separator 22.

Once the cylindrical separator 22 is formed around the insertion tool 100, the insertion tool 100 pushes the separator into the interior of cathode ring 20. Upon initial insertion, the combination of the insertion tool 100 and the separator 22 have a diameter smaller than the internal diameter of the cathode ring 20, such that the separator 22 may be inserted into the cylindrical cell 10 without substantially disturbing the cathode ring 20. Once the separator 22 is at least partially inserted into the cell 10, the insertion tool 100 may expand to press the separator 22 against the interior walls of the cathode ring 20 to conform the separator 22 to the shape of the interior surface of the cathode ring 20. As noted herein, the insertion tool 100 may comprise an expansion mechanism such as an inflatable bladder 110 surrounding an exterior of the insertion tool 100 that may be inflated to apply a radial pressure to push the separator 22 against the interior walls of the cathode ring 20. The inflatable bladder 110 may be inflated with a fluid, such as a gaseous composition (e.g., air, heated air, steam, inert gas, a vapor, and/or the like) or a liquid composition (e.g., water, heated water, oil, heated oil, and/or the like). In other embodiments, the insertion tool 100 may comprise one or more mechanically actuated expansion panels 150 that may be actuated via pistons, mechanical linkages, and/or the like within the interior of the insertion tool 100.

The expansion mechanism is configured to press the separator 22 against the interior walls of the cathode ring 20 to minimize and/or eliminate voids existing between the cathode ring 20 and the separator 22. Moreover, the insertion tool 100 may comprise one or more heating mechanisms 160 and/or steam mechanisms to eliminate creases and/or other imperfections within the separator 22 while positioned within the cathode ring 20. In various embodiments, the insertion tool 100 may comprise one or more steam nozzles 170 configured to apply steam to the separator 22 while positioned within the cathode ring 20. The application of steam directly to the separator 22 may cause the removal of one or more creases, wrinkles, and/or the like within the separator 22 to provide an at least substantially smooth separator 22 having an at least substantially smooth shape corresponding to the shape of the interior surface of the cathode ring 20.

Moreover, the insertion tool 100 may be configured to apply heat to at least a portion of the separator 22 to heat seal at least the overlapping portions of the separator 22. As noted above, the insertion tool 100 may comprise an inflatable bladder 110 that may be filled with a heated fluid, such as steam, heated water, and/or heated oil. The heated fluid within the inflatable bladder 100 may apply heat to the separator 22 sufficient to melt at least a portion of the synthetic fibers within the separator paper to heat seal layers of the separator 22 relative to one another. However, it should be noted that the insertion tool 100 may comprise separate heating elements 160 (e.g., resistance heaters) configured to directly apply heat to the overlapping portions of the separator 22 (e.g., overlapping portions within the walls of the separator and/or overlapping portions in the closed bottom end of the separator).

Once the separator 22 is placed within the cathode ring 20, the insertion tool 100 may be removed from the cathode ring 20, leaving the separator 22 behind. Particularly in those embodiments in which the insertion tool 100 comprises one or more expansion configurations, the insertion tool 100 may reduce its diameter (e.g., by reducing the diameter of the expansion configuration) such that the outer diameter D of the insertion tool 100 is not in direct contact with the interior surface of the convolute separator 22. The insertion tool 100 may then be removed from the electrochemical cell 10, leaving an interior portion of the separator 22 open for the placement of anode material therein.

After removal of the insertion tool 100, anode material may be added to the remaining opening within the interior of the separator 22, and free electrolyte may be added to the interior of the electrochemical cell 10. Because the separator insertion tool 100 caused removal of substantially all wrinkles and/or creases within the separator 22, the added anode material may form an anode component 24 having a sidewall shape corresponding to the shape of the interior surface of the separator 22 (and corresponding to the interior shape of the cathode ring 20). The anode material may be a gelled anode material that may be extruded or otherwise added to the interior of the separator 22. Thereafter, the anode 24, current collector 34, and seal arrangement 32 are put in place to seal the open end of the container 12 and to form a complete electrochemical cell 10. Again, because the separator 22 is provided substantially free of creases and/or wrinkles, the useful volume occupied by active material, including both cathode and anode material, is maximized within the interior of the electrochemical cell 10.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electrochemical cell comprising:
a container;
a ring-shaped cathode disposed within the container wherein the cathode includes an exterior surface in contact with the container and an interior surface surrounding a hollow interior;
an anode disposed within the hollow interior of the cathode; and
a separator positioned between the cathode and the anode,
wherein the separator has a tubular sidewall and a closed bottom end,
wherein the tubular sidewall has at least one overlapping portion defined by at least two layers of a separator sheet being positioned between the cathode and the anode,
wherein at least a portion of the separator is steamed while in place adjacent to the interior surface of the ring-shaped cathode, and
wherein at least part of the overlapping portion is heat sealed after the at least a portion of the separator is steamed, such that the at least two layers are bonded relative to one another.

2. The electrochemical cell of claim 1, wherein the separator is a nonwoven fibrous separator.

3. The electrochemical cell of claim 2, wherein the nonwoven fibrous separator comprises thermoplastic fibers and wherein portions of the thermoplastic fibers positioned within at least part of the overlapping portions are melt-bonded relative to one another.

4. The electrochemical cell of claim 1, wherein the separator sheet is ion permeable.

5. The electrochemical cell of claim 4, wherein the overlapping portions of the separator sheet are ion permeable.

6. The electrochemical cell of claim 1, wherein the separator is a convolute separator comprising a spirally wound separator sheet and having a first end and a second end, and wherein the first end overlaps the second end to form an overlapping portion.

7. The electrochemical cell of claim 1, wherein at least a portion of the closed bottom end is heat sealed.

8. The electrochemical cell of claim 7, wherein the closed bottom end of the separator is ion permeable.

9. The electrochemical cell of claim 1, wherein the separator has an open top opposite the closed bottom end, and wherein the heat seal extends between the open top and the closed bottom end.

10. The electrochemical cell of claim 1, wherein the separator is radially pressed against the interior surface of the cathode.

* * * * *